Patented July 4, 1950

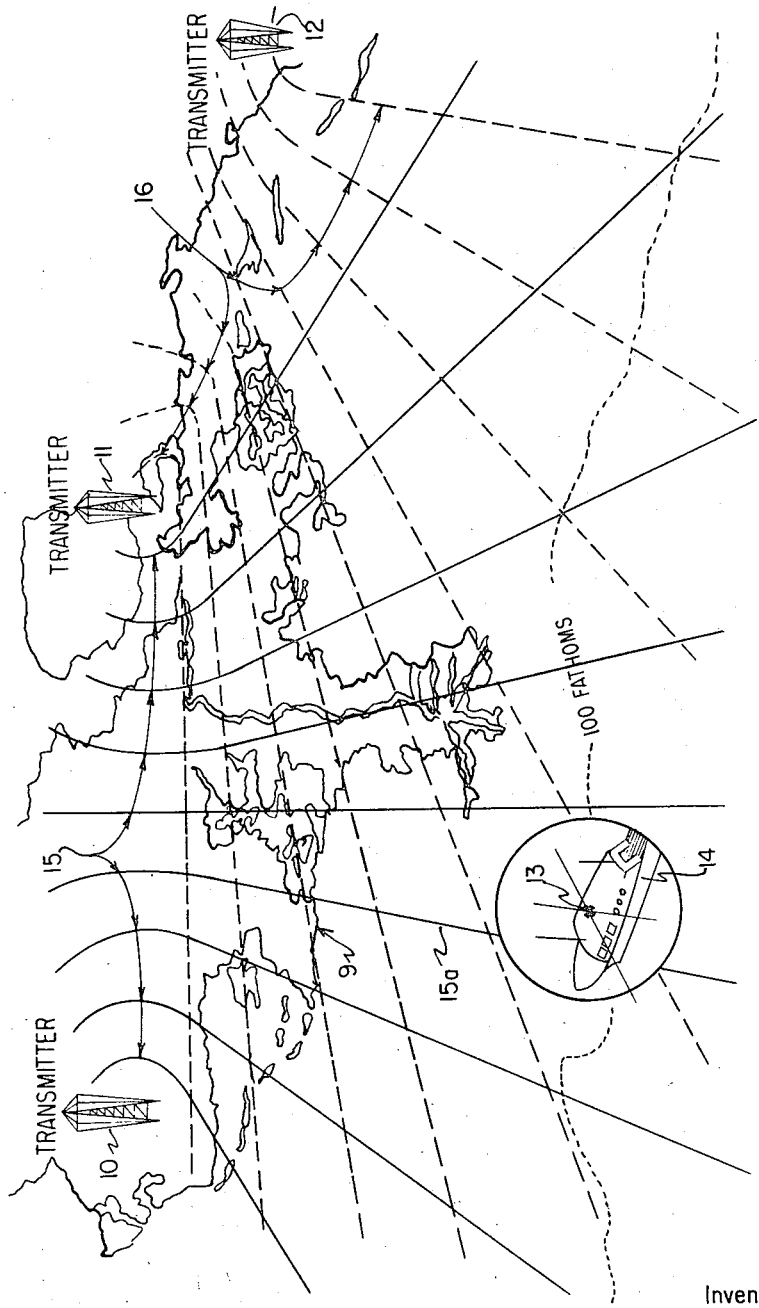

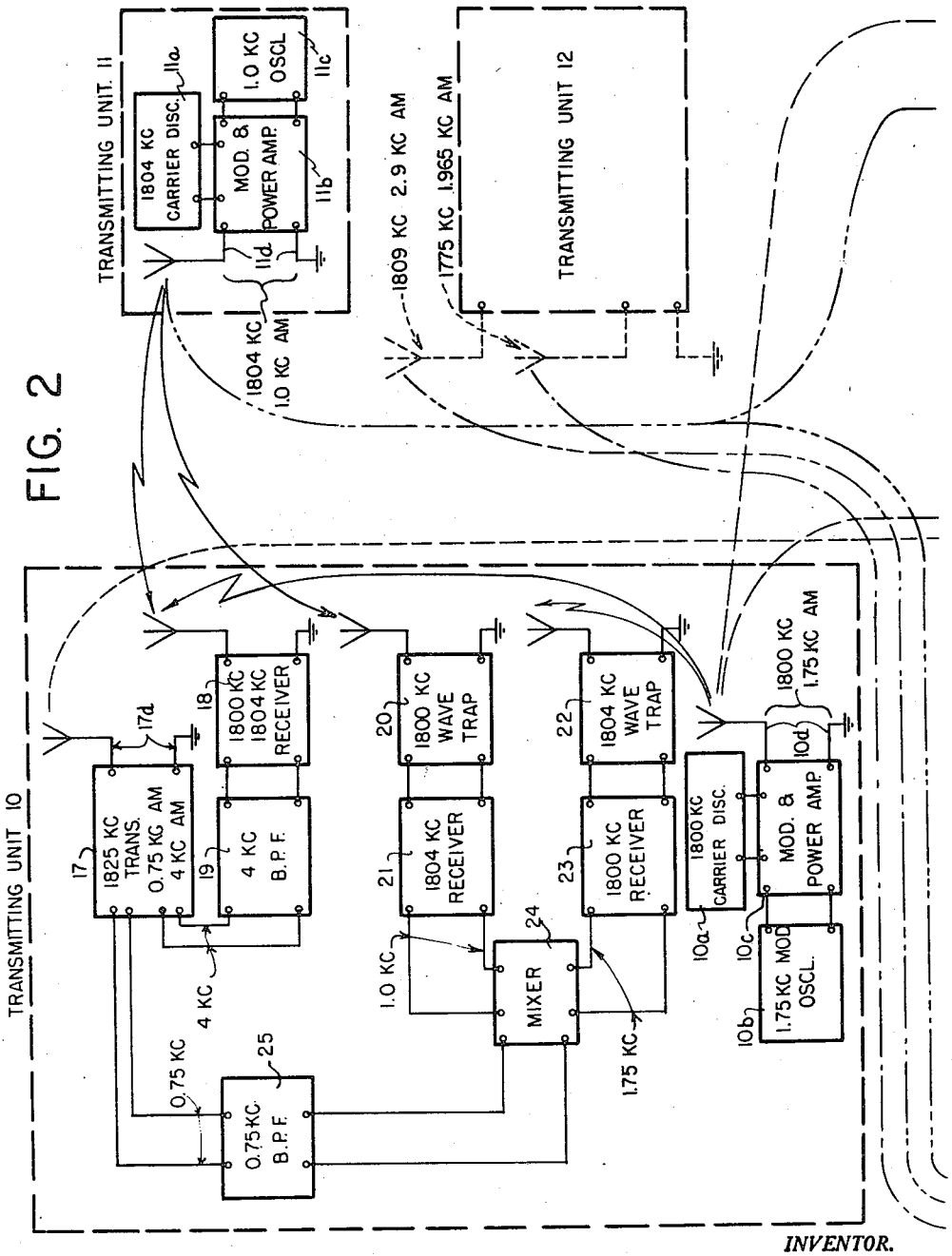

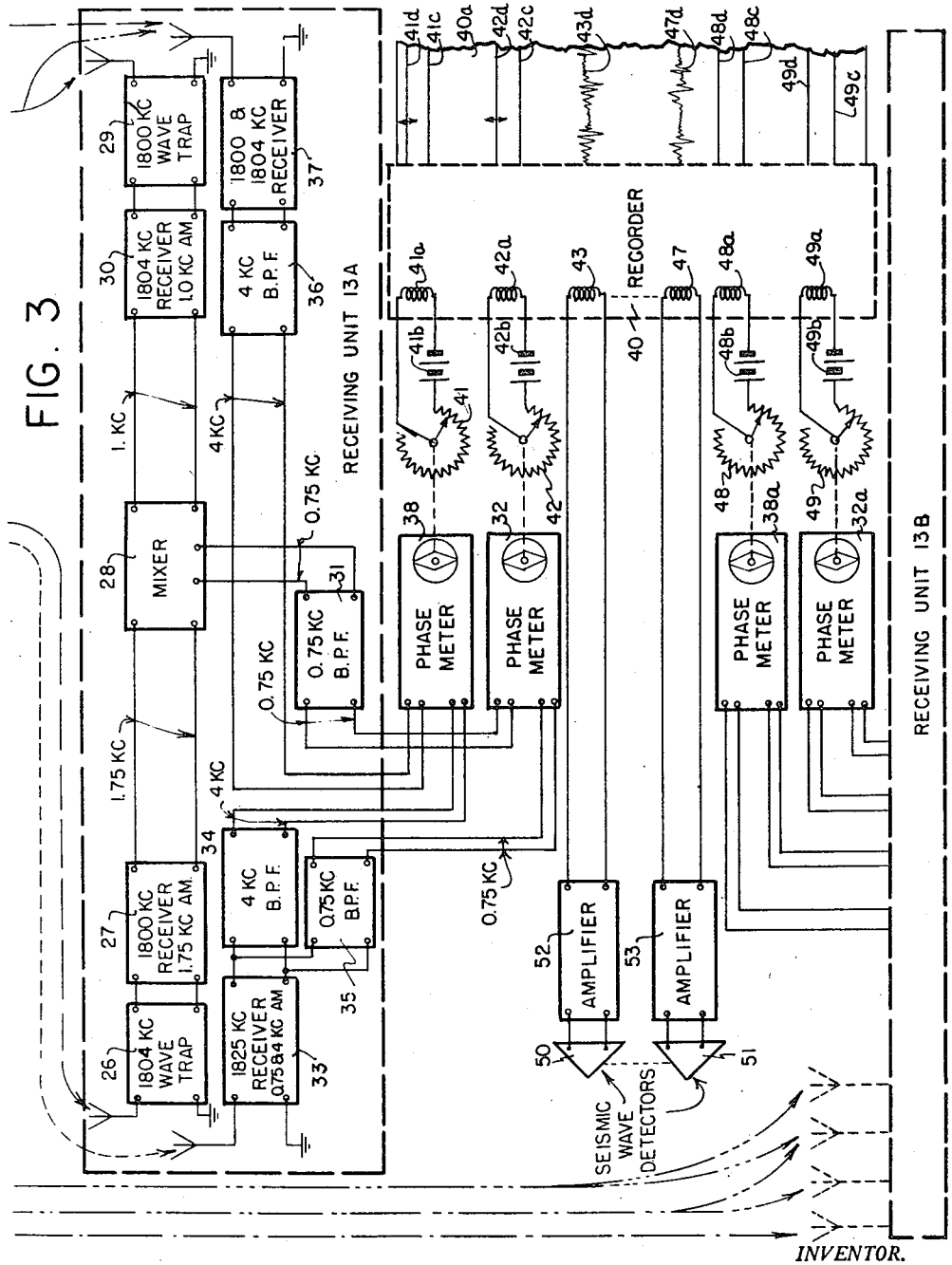

2,513,314

UNITED STATES PATENT OFFICE 2,513,314

GEOPHYSICAL PROSPECTING SYSTEM

James E. Hawkins, Tulsa, Okla., assignor to Seismograph Service Corporation, Tulsa, Okla., a corporation of Delaware Application October 9, 1947, Serial No. 778,793

5 Claims. (Cl. 343—105)

The present invention relates to improvements in systems of geophysical prospecting and more particularly to an improved system for obtaining and correlating seismic data and position data in conducting seismic survey operations over water covered areas. The subject matter of this application is related to applicant's copending application Serial No. 778,794, filed October 9, 1947.

One of the most difficult problems encountered in conducting seismic survey operations over water covered areas is that of accurately determining and recording the positions of the shot and detector points, particularly when the operations are conducted out of sight of land marks located along the shore line. At present, the seismic data and position data are separately recorded in different forms and on different record media, thus increasing the labor and possibility of error involved in correlating and interpreting the records. Further, pulse-echo radar systems employing targets located at known points along the shore line bounding a water covered area under survey are relied upon in seismic operations on water to obtain the desired position information. Such systems are expensive to obtain and maintain, and must be handled by skilled operators in order to obtain usable information. Moreover, the accuracy obtained with pulse-echo systems, while substantially greater than that obtained through the use of known types of direction finding systems, is far from that desired.

It is an object of the present invention, therefore, to provide an improved system of geophysical prospecting in which the above-mentioned disadvantages are entirely obviated.

It is another object of the present invention to provide a system of geophysical prospecting of the character described, particularly suitable for use in prospecting over water covered areas, in which position data and indications or signal representative of subsurface structural conditions are recorded on a common record element in a form which permits ready correlation and interpretation thereof.

It is still another object of the present invention to provide a system of the character described which is simple to operate, reliable in operation and provides extremely accurate position data regarding the points at which seismic data is obtained.

The invention, both as to its organization and method of operation, together with further objects and advantages thereof, will best be understood by reference to the specification taken in connection with the accompanying drawings, in which:

Fig. 1 is a pictorial representative of a water covered area over which seismic survey operations are to be performed, illustrating the positional arrangement of the transmitting units embodied in the system and the grid system of hyperbolic equi-phase lines formed in space by the signals radiated from these transmitting units;

Fig. 2 diagrammatically illustrates the arrangement of the transmitting units embodied in the system shown in Fig. 1; and Fig. 3 diagrammatically illustrates the receiving, translating and recording equipment provided aboard the recording boat at which position indications are obtained.

Referring now to the drawings, the present invention is there illustrated in its embodiment in a system for conducting seismic survey operations upon the Gulf of Mexico. Specifically the segment 9 of the illustrated shore line bounds the southern shores of Texas and Louisiana. The dash line disposed below this shore line segment represents the dividing line between waters having a depth less than one hundred fathoms and a depth more than one hundred fathoms, it being observed that with present-day techniques, oil well drilling operations are not particularly successful when undertaken in waters having depths much in excess of one hundred fathoms. Thus, for practical purposes, it may be assumed that the area within which position information is desired is that disposed between the one hundred fathom line and the shore line segment 9.

In brief, the position finding apparatus of the illustrated system comprises three transmitting units 10, 11, and 12 which are spaced apart approximately equal distances along the shore line 9 and are so positioned that the line bisecting the units 10 and 11 is angularly related to the line bisecting the units 11 and 12. As specifically described below, these transmitting units are equipped continuously to radiate amplitude modulated carrier waves having carrier components of different frequencies and modulation components of different frequencies such that standing waves are produced in space to blanket the area under survey. Four sets of hyperbolic equi-phase lines between the standing waves are thus produced. More specifically, the continuously radiated carrier wave components of the waves produce standing waves in space which provide two sets of hyperbolic equi-phase lines each of which is representative of the locii of positions of constant phase difference between the carrier components of the radiated waves. Thus, the survey transmitters of the units 10 and 11 cooperate to produce standing carrier waves having hyperbolic equi-phase lines 15. Similarly, the survey transmitters of the units 11 and 12 cooperate to provide a carrier standing wave pattern comprised of hyperbolic equi-phase lines 16. All of the equi-phase lines have not been illustrated in Fig. 1 of the drawings, but enough have been shown to demonstrate the fact that a grid of hyperbolic equi-phase lines is laid down to blanket the area under survey by the two pairs of transmitting units 10, 11 and 11, 12. In an entirely similar manner the modulation components of the waves radiated by the pair of transmitters 10 and 11 produce standing waves having hyperbolic equi-phase lines therebetween which intersect the corresponding lines resulting from the modulation components of the waves radiated by the second pair of transmitters 11 and 12.

The system further comprises translating and receiving equipment 13 aboard each recording boat 14 operating in the area under survey. In this connection, it may be pointed out that in seismic survey work over water, it is conventional practice to equip each survey crew with a recording boat on which all recording operations are performed. It may further be pointed out that any number of recording boats equipped with receiving and translating equipment 13 of the character shown in Fig. 3 of the drawings may utilize the signals originating at the transmitting units 10, 11, and 12 to obtain the desired position information.

As best shown in Fig. 2 of the drawings, each of the transmitting units 10, 11, and 12 is comprised of a survey transmitter for radiating a modulated carrier wave. The translating units 10 and 12 are additionally equipped with link transmitters and with receiving means arranged for carrier and modulation component heterodyning in the manner more fully explained below. Specifically, the survey transmitter embodied in the unit 10 comprises a carrier wave generator or oscillator 10a, a modulation wave generator or oscillator 10b and a modulator and power amplifier unit 10c in which the output from the oscillator 10b is amplitude modulated upon the output of the carrier wave oscillator 10a and amplified for radiation by the antenna-ground circuit 10d. Similarly, the survey transmitter embodied in the transmitting unit 11 comprises a carrier wave oscillator or generator 11a, a modulation wave generator or oscillator 11c and a modulator and power amplifier unit 11b in which the modulation wave output of the generator 11c is amplitude modulated upon the carrier wave output of the generator 11a and then amplified for radiation by the antenna-ground circuit 11d. The survey transmitter embodied in the transmitting unit 12 is identical with the survey transmitter just described, with the exception that the output frequencies of the carrier and modulation wave generators thereof are different from the output frequencies of the corresponding generators embodied in the survey transmitter of the units 10 and 11.

As indicated above, the carrier frequencies at which the survey transmitters of the three transmitting units 10, 11, and 12 operate are sufficiently different to permit separation thereof on a frequency selective basis. Preferably, however, the frequency separation between the survey transmitter carriers is small enough to be embraced within not more than two channel allocations of ten kilocycles specified by the Federal Communications Commission. To this end, the output frequencies of the carrier wave generators 10a, 11a, and 12a embodied in the survey transmitters of the units 10, 11, and 12 may be 1800 kilocycles, 1804 kilocycles and 1809 kilocycles, respectively, such that four and five kilocycle spacings are provided between the output carrier frequencies of the survey transmitters in the transmitting unit pairs 10, 11, and 11, 12. The output frequencies of the modulation wave generators embodied in the three units 10, 11 and 12 are also different. For example, the generator 11c may be designed to operate at a fixed frequency of 1.0 kilocycle, whereas the corresponding generators of the units 10 and 12 may be designed to operate at 1.75 and 2.9 kilocycles, respectively. Employing the frequencies specifically specified, the survey transmitter of the unit 10 functions to radiate a carrier wave of 1800 kilocycles amplitude modulated at a frequency of 1.75 kilocycle; the survey transmitter of the unit 11 functions to radiate a carrier of 1804 kilocycles amplitude modulated at 1.0 kilocycle; and the survey transmitter of the unit 12 operates to radiate a carrier wave of 1809 kilocycles amplitude modulated at a modulation frequency of 2.9 kilocycles. The power of the survey transmitters is such that the entire area to be surveyed is blanketed with the radiated waves and that these waves have a field strength at any and all points within this area sufficient to permit reliable reception without requiring undue sensitivity of the receiving equipment.

In order to obviate the necessity for phase synchronization of the carrier and modulation components of the signals radiated from the three survey transmitters, facilities are provided in the transmitting units 10 and 12 for transmitting continuously from these two transmitting units reference signals representative of the carrier and modulation component difference frequencies, so that they may be received at any receiving point such, for example, as aboard the recording boat 14, located within the area under survey. The equipment for this purpose as provided at each of the transmitting units 10 and 12 is identical and hence only that embodied in the unit 10 has been illustrated in the drawings. In brief, this equipment comprises a fixed tuned receiver 18 which is sharply selective to the 1800 and 1804 kilocycle carriers respectively radiated by the survey transmitters of the units 10 and 11. Preferably, the selectivity of this receiver is such that the 1809 kilocycle carrier originating at the transmitting unit 12 is rejected in the radio frequency section thereof. The beat frequency of four kilocycles between the two carriers accepted by the radio frequency sections of the receiver 18 is passed on a selective basis by a sharply tuned four kilocycle band pass filter 19 and delivered to the modulator stage of a link transmitter 17 for amplitude modulation upon the carrier output of this transmitter and radiation by the antenna-ground circuit 17d. Thus, the receiver 18 and the band pass filter 19 cooperate with the link transmitter 17 in their response to the carrier components of the waves radiated by survey transmitters of the units 10 and 11, to transmit a signal which is truly representative of (equal to) the beat frequency between the carrier components of the waves radiated by the survey transmitters of the units 10 and 11. Apparatus is also provided for amplitude modulating the carrier output of the link transmitter 17 with a signal which is truly representative of the difference frequency between the modulation components of the waves radiated by the survey transmitters of the units 10 and 11. This apparatus comprises a receiving channel which includes an 1800 kilocycle wave trap 20 and a fixed tuned 1804 kilocycle receiver 21 connected in tandem in the order named for receiving and detecting the 1.0 kilocycle modulation component of the wave radiated from the survey transmitter of the unit 11; and 1804 kilocycle wave trap 22 and a fixed tuned 1800 kilocycle receiver 23 connected in tandem in the order named for receiving and detecting the 1.75 kilocycle modulation component of the wave radiated by the survey transmitter of the unit 10; a mixer 24 for heterodyning the detected 1.0 and 1.75 kilocycle modulation components; and a sharply tuned 0.75 kilocycle band pass filter 25 for passing the 0.75 kilocycle difference frequency signal to the modulator stage of the transmitter 17 for amplitude modulation upon the carrier output of the transmitter 17. This link transmitter is designed to operate at a carrier frequency, such for example, as 1825 kilocycles, which is distinguishable from the carrier frequencies of the three survey transmitters.

As indicated above, the receiving and link transmitting equipment provided in the transmitting unit 12 is entirely similar to that provided at the transmitting unit 10 and described above. It is noted, however, that the carrier wave receiver forming a part of this equipment as provided in the unit 12 is designed to accept only the 1804 kilocycle and 1809 kilocycle carriers radiated by the survey transmitter of the units 11 and 12 and to reject the 1800 kilocycle carrier radiated by the survey transmitter of the unit 10. Further, the modulation wave receiving and detecting equipment as provided at the transmitting unit 12 is designed to receive, detect, mix, and select the difference frequency between the modulation components of the waves radiated by the survey transmitting units 11 and 12. The two detected difference frequency signals of 1.9 and 5 kilocycles are amplitude modulated upon the carrier output of the link transmitter in the unit 12 which may be designed to operate at the distinguishable carrier frequency of 1775 kilocycles.

From the foregoing explanation, it will be understood that five distinct and distinguishable amplitude modulated carrier waves are radiated from the three transmitting units 10, 11, and 12. Specifically, the survey transmitter embodied in the transmitting unit 10 radiates a carrier wave of 1800 kilocycles modulated at a frequency of 1.75 kilocycles, the survey transmitter embodied in the transmitting unit 11 radiates a carrier wave of 1804 kilocycles modulated at a frequency of 1.0 kilocycle, and the survey transmitter incorporated in the transmitting unit 12 radiates a carrier wave of 1809 kilocycles modulated at a frequency of 2.9 kilocycles. The carrier and modulation wave components of these three continuously radiated signals are adapted to be heterodyned by the receiving and translating equipment provided aboard any recording boat 14 within the radius of transmission of the three transmitting units. In addition to these three signals, two reference signals are also continuously radiated by the link transmitters embodied in the two transmitting units 10 and 12. Thus the link transmitter 17 forming a part of the transmitting unit 10 continuously radiates a carrier wave of 1825 kilocycles which is amplitude modulated at a frequency of 4 kilocycles representative of the difference frequency between the carrier wave frequencies of the survey transmitters embodied in the units 10 and 11 and also modulated at a frequency of 0.75 kilocycle which is representative of the difference frequency between the modulation components of the waves continuously radiated by the survey transmitters of the two units 10 and 11. In similar manner, the link transmitter embodied in the transmitting unit 12 radiates a carrier wave of 1775 kilocycles which is modulated at a frequency of 5 kilocycles representative of the difference frequency between the carrier waves radiated by the survey transmitters of the two units 11 and 12, and also modulated at a frequency of 1.9 kilocycles representative of the difference frequency between the modulation components of the waves transmitted by the survey transmitters of the two units 11 and 12. These five signals, as radiated from the three units 10, 11, and 12, are received and translated by the equipment illustrated in Fig. 3 of the drawings to provide indications from which the geographical position of the receiving equipment may be precisely ascertained, all in the manner more fully explained below.

To describe now more particularly the equipment provided aboard each recording boat 14 for deriving position information from the described signals radiated by the three transmitting units 10, 11, and 12, as well as for recording this information concurrently with the recording of seismic waves, reference is made to Fig. 3 of the drawings wherein this equipment is diagrammatically illustrated. In general, this equipment comprises two receiving units 13A and 13B of identical arrangement, a conventional oscillographic recorder 40 which may be of any desired commercial construction and preferably is of the twenty-four trace variety, a plurality of seismic wave amplifying channels, two of which are indicated at 52 and 53, for separately impressing seismic waves detected by a pair of geophones 50 and 51 upon the galvanometer coils 43 and 47 of different recording elements embodied in the recorder 40, and four phase angle meters 32, 38, 32a and 38a. In the usual case, the geophones or seismic wave detectors 50—51 are cable connected to the recording boat 14. As shown, the two phase meters 32 and 38 are associated solely with the receiving unit 13A, whereas the two phase meters 32a and 38a are associated solely with the receiving unit 13B. Preferably, these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. For the purpose of recording the indications provided by these phase meters during operation of the equipment, the rotor element of each meter is gear-connected to actuate the movable contact of a potentiometer incorporated in the energizing circuit for one of the galvanometer coils of the recorder 40. Thus, the rotor element of the phase meter 38 is gear connected to change the setting of the potentiometer 41 in direct proportion to changes in the phase angle measured by this meter. This potentiometer is connected to be adjustably encircuited in the energizing circuit of the galvanometer coil 41a of the recorder 40 in series with an energizing battery 41b. Similarly, the rotor elements of the meters 32, 32a and 38a are arranged to control the settings of potentiometers 42, 49, and 48 respectively, which are connected in series with batteries 42b, 49b and 48b, respectively, in the circuits for energizing the galvanometer coils 42a, 49a, and 48a of the recorder 40.

Referring now more particularly to the component arrangement of the receiving unit 13A, it will be noted that this unit comprises four separate and distinct signal translating channels. The first of these channels comprises an 1804 kilocycle wave trap 26 and a fixed tuned 1800 kilocycle receiver 27 which is designed to detect and deliver to a mixer stage 28 the 1.75 kilocycle modulation component of the wave radiated from the survey transmitter of the transmitting unit 10. The purpose of providing the 1804 kilocycle wave trap ahead of the receiver 27 is to prevent this receiver from responding to the modulated carrier wave radiated by the survey transmitter of the transmitting unit 11. Thus the receiver 27 delivers at its output terminals only the detected 1.75 kilocycle modulation component of the signal radiated by the survey transmitter of the transmitting unit 10. This signal must be heterodyned with the modulation component of the signal radiated from the survey transmitter of the unit 11 to provide a difference frequency signal which may be phase compared with the modulation frequency reference signal of 0.75 kilocycle transmitted by the link transmitter of the unit 10 in order to obtain one of the phase indications from which the desired position information is obtained. To this end, the second signal channel is comprised of an 1800 kilocycle wave trap 29 and a fixed tuned 1804 kilocycle receiver 30 for detecting the 1.0 kilocycle modulation component of the signal radiated by the survey transmitter of the transmitting unit 11. Here again, the purpose of providing the wave trap 29 is to exclude the signal radiated from the survey transmitter of the unit 10 from the radio frequency section of the receiver 30. The detected 1.0 kilocycle signal thus produced at the output terminals of the receiver 30 is delivered to the second set of input terminals of the mixer 28. The difference frequency signal of 0.75 kilocycle between the 1.75 and 1.0 kilocycle signals impressed upon the mixer 28 is obtained by connecting the output terminals of this mixer to a filter 31 having a pass character sharply peaked at a center frequency of 0.75 kilocycle and having its output terminals connected to the upper set of input terminals of the phase meter 32.

The third of the four signal translating channels provided in the receiving unit 13A performs the function of heterodyning the carrier wave components of the signals radiated by the survey transmitters of the two transmitting units 10 and 11. To this end, a receiver 37 is provided in this channel which is fixed tuned to accept only carrier waves of 1800 and 1804 kilocycles and is relatively insensitive to frequencies outside of the narrow band specified. With such an arrangement, the carrier wave components of the signals radiated from the survey transmitters in the two units 10 and 11 are heterodyned in the radio frequency section of the receiver 37 and the difference frequency of 4 kilocycles is detected and passed through the audio section of the receiver to the output terminals thereof, along with the detected modulation components of the two received signals. This difference frequency signal is, in turn, passed through a filter 36 which is sharply tuned to pass only 4 kilocycle signals and hence rejects the 1 and 1.75 modulation components of the two received signals. Finally, the 4 kilocycle difference frequency signal as delivered at the output side of the unit 36 is impressed on the upper set of input terminals of the phase meter 38.

The fourth signal translating channel provided in the receiving unit 13A is for the purpose of receiving and detecting the reference signals riding as modulation components upon the carrier radiated from the link transmitter of the transmitting unit 10. Specifically, this channel comprises a fixed tuned 1825 kilocycle receiver 33 capable of receiving, detecting and delivering to its output terminals the 0.75 and 4 kilocycle modulation components of the signal radiated by the link transmitter 17. The output signal of the receiver 33 is delivered to the parallel connected input terminals of two narrow band pass filters 34 and 35 which are tuned to center frequencies of 0.75 and 4 kilocycles respectively. Thus, the 4 kilocycle component of the signal appearing at the output side of the receiver 33 is rejected by the filter 35 and passed by the filter 34 to be applied to the lower set of the input terminals of the phase meter 38 for phase comparison with the 4 kilocycle difference frequency signal delivered to the upper set of input terminals of this phase meter from the receiver 37 and the filter 36. Similarly, the 0.75 kilocycle component of the signal appearing at the output side of the receiver 33 is rejected by the filter 34 and passed by the filter 35 to be applied to the lower set of input terminals of the phase meter 32 for phase comparison with the difference frequency signal of 0.75 kilocycle between the modulation components of the signals radiated by the survey transmitter of the units 10 and 11. Thus, it will be understood that the phase meter 32 functions to produce an indication of the phase relationship between a signal representative of the difference frequency between the modulation components of the signals radiated by the survey transmitters 10 and 11 and a reference signal obtained by heterodyning these modulation components at or in proximity to the transmitting unit 10 and by transmitting the same to the receiving point by way of the carrier radiated by the link transmitter 17. It will also be understood that the phase meter 38 functions to indicate the phase angle between a signal representative of the difference frequency between the carrier components of the waves radiated by the survey transmitters of the units 10 and 11 and a reference signal of the same frequency obtained by heterodyning these carrier components at or in proximity to the transmitting unit 10 and by transmitting the heterodyned signal as a modulation component on the carrier radiated by the link transmitter 17. Since the receiving unit 13B is identical with the receiving unit 13A just described, except for the signal frequency acceptance characteristics of the receivers embodied therein, it will be understood that the phase meter 32a is assigned the modulation component phase comparison function, whereas the phase meter 38a is assigned the carrier component phase comparison function. In this regard, it may be pointed out that the four signal transmission channels of the receiving unit 13B are designed to respond only to the three signals radiated from the two survey and one link transmitter of the transmitting units 11 and 12. Thus, the receiving unit 13A is designed to respond to the three signals originating in the pair of transmitting units 10 and 11 and the receiving unit 13B is designed to respond to the three signals originating at the pair of transmitting units 11 and 12.

In considering the operation of the above described system, it will be understood that at any location of the recording boat 14 within the radius of transmission of each of the three transmitting units 10, 11, and 12, the receiving unit 13A is arranged to measure the phase angle between the standing waves produced in space by the transmitters 10 and 11, both as regards the modulation and carrier components of the radiated waves, and the receiving unit 13B performs the same function in its response to the waves radiated by the transmitting units 11 and 12. More specifically, the modulated carrier wave radiated from the survey transmitter of the transmitting unit 10 is passed by the wave trap 26, selected, amplified and demodulated in the receiver 27, with the result that the 1.75 kilocycle modulation component thereof is delivered to the left set of input terminals of the mixer 28. Similarly, the modulated carrier wave radiated by the survey transmitter of the transmitting unit 11 is passed by the wave trap 29, selected, amplified and demodulated in the receiver 30, with the result that the 1.0 kilocycle modulation component thereof is delivered to the right set of input terminals of the mixer 28. This mixer operates in an entirely conventional manner to produce sum and difference frequency signals across its output terminals when energized by the 1.75 and 1.0 kilocycle input signals. However, only the difference frequency signal of 0.75 kilocycle as developed across the output terminals of the mixer 28 is passed by the 0.75 kilocycle filter 31 to be applied to the upper set of input terminals of the phase meter 32. The phase meter 32 functions to determine the phase relationship between 0.75 kilocycle signal thus obtained and the 0.75 kilocycle signal which is obtained by heterodyning at the transmitting unit 10 the modulation components of the waves radiated by the survey transmitters of the units 10 and 11. Thus, the 0.75 kilocycle modulation component of the 1825 kilocycle carrier radiated by the link transmitter 17 of the unit 10 is detected in the receiver 33 and passed by the filter 35 for application to the lower set of input terminals of the phase meter 32 in the exact manner explained above. When thus energized by two input signals which may have a phase displacement ranging from zero to 360°, the rotor element of the phase meter 32 assumes a setting precisely representative of the phase angle between the two signal voltages and, hence, provides an indication of the position of the receiving point, namely, the recording boat 14, relative to an equi-phase line between the standing waves of the modulation components respectively radiated by the survey transmitters of the two transmitting units 10 and 11. With the described arrangement, wherein signal frequencies of 1.0 and 1.75 kilocycles are heterodyned, the wave length spacing of the equi-phase lines is determined by the mean frequency of 1.375 kilocycles between the two modulation frequencies. At this particular mean frequency, equi-phase lines representative of the same phase relationship between the standing waves are spaced a distance of about 68 miles apart. Hence, the distance indication provided by the phase meter 32 identifies the position of the recording boat 14 within a zone not less than 68 miles in width, i. e., a zone having a minimum width equal to one-half the wave length of a wave having a frequency equal to the mean frequency of the modulation components of the waves radiated by the survey transmitters of the two units 10 and 11. Specifically, the indication provided by the meter 32 shows the position of the recording boat in terms of the distance of this boat from one equi-phase line, in most cases the first line removed from the transmitting unit 10. Due to the wide spacing between the equi-phase lines, it is, of course, easy for the equipment operator to determine which of these lines the particular indication provided by the meter 32 is related to.

In a similar manner, the phase meter 32a responds to the difference frequency signals derived from the heterodyning of the modulation components of the waves radiated by the transmitting units 11 and 12 to provide an indication representative of the distance of the recording boat 14 from the transmitting unit 12, for example. This indication is likewise based upon a half wave length spacing of the equi-phase lines, which spacing has a large order of magnitude. The two indications thus provided by the phase meters 32 and 32a may be resolved into distance indications from which the position of the boat relative to the two transmitting units 10 and 12 may readily be determined. Due to the relatively wide range of distances over which the phase meters 32 and 32a are required to provide indications, the accuracy afforded by these indications is not within the limits prescribed by survey work of the character under consideration. It is for this reason that the short wave length carrier components of the waves radiated by the survey transmitters of the three transmitting units 10, 11, and 12 are relied upon to provide distance indications which are accurate within a matter of a foot or less at ranges of 50 miles or more.

Specifically, the carrier components of the waves radiated by the survey transmitters of the units 10 and 11 are intercepted by the antenna ground circuit of the receiver 37 and are heterodyned in the radio frequency stages of this receiver to develop a four kilocycle beat frequency signal which is detected at the second detector stage of the receiver and passed through the audio channel thereof to appear across the output terminals of the receiver. The modulation components of 1.0 and 1.75 kilocycles riding on the two carriers radiated from the survey transmitters of the units 10 and 11 may also be detected and passed to the output terminals of this receiver. These signals are, however, rejected by the filter 36, whereas the 4 kilocycle beat frequency signal is passed by this filter and impressed upon the upper set of input terminals of the phase meter 38. This phase meter functions to measure the phase angle between the described 4 kilocycle beat frequency signal and the 4 kilocycle beat frequency signal which is obtained by heterodyning the carrier components of the waves radiated by the survey transmitters of the units 10 and 11 at the transmitting unit 10. Thus, the 4 kilocycle modulation component of the wave radiated by the link transmitter 17 is detected by the receiver 33 and passed by the filter 34 to be applied to the lower set of input terminals of the phase meter 38. Here, again, the phase angle between the two applied signal voltages as measured by the meter 38 may have a value ranging from 0 to 360°, depending upon the position of the recording boat relative to the transmitting units 10 and 11. The particular phase angle indicated by the setting of the rotor element embodied in the meter 38 accurately locates the position of the recording boat 14 relative to one of the equi-phase lines 15 pictured in Fig. 1 of the drawings. In this case, the minimum spacing between the equi-phase lines is also determined by the mean frequency of the carrier frequencies employed at the survey transmitters of the units 10 and 11; specifically, at a frequency of 1802 kilocycles. At this frequency, the spacing between equi-phase lines representative of the same phase angle between the carrier components of the waves radiated by the survey transmitters of the units 10 and 11 ranges upward from approximately 273 feet. It will be apparent, therefore, that the total indicating range represented by one complete revolution of the rotor element embodied in the phase meter 38 covers a distance of the order of 273 feet and hence that the accuracy of this indication is extremely high. On the other hand, while the accuracy of indication provided by this meter is excellent and far superior to that provided by the phase meter 32, the limited range of distance over which the meter 38 operates makes it imperative that the approximate position of the boat 14 be known, due to the relatively large number of zones within which the same indication is provided by this meter. Thus, it is quite difficult and practically impossible to maintain a log on the position of the boat 14 with sufficient continuity to know at all times the particular 273 foot zone within which the boat is located. Hence, the importance of obtaining the position of the boat with approximate accuracy through operation of the phase meters 32 and 32a becomes manifest. In this regard, it is noted that the accuracy of indication of the two meters 32 and 32a is well within that required definitely to locate the 28 foot zone to which the indications provided by the phase meters 38 and 38a relate. To summarize, the phase meters 32 and 32a provide distance indications which locate with approximate accuracy the position of the boat 14 relative to the known positions of the three transmitting units 10, 11, and 12, and the phase meters 38 and 38a provide distance indications which locate the position of the boat 14 relative to the known positions of the same transmitting units with precision accuracy.

As described above, the rotatable indicating elements of the four phase meters are respectively geared to the movable contacts of the potentiometers 41, 42, 48 and 49. Hence, as the settings of the phase meter indicating elements are changed, the magnitudes of current flow through the associated ones of the galvanometer coils 41a, 42a, 48a and 49a are correspondingly changed to produce corresponding changes in the settings of the galvanometer mirrors respectively associated with these coils. Thus, the system is so arranged that the four distance indications may be recorded by the recorder 40 concurrently with recording of the seismic signals developed during a seismic shooting operation.

The manner in which the seismic wave detectors 50—51 are arranged in a predetermined array relative to a shot point and function to convert into electrical signals the reflected and refracted seismic rays resulting from detonation of an explosive charge at the shot point will be readily understood by those skilled in the art of seismic surveying. In the usual case, the explosive charge is detonated beneath the surface of the body of water over which these survey operations are being conducted, at a known position displaced a predetermined distance from the detector array, and the detectors are likewise positioned beneath the surface of the body of water under survey and are displaced from each other a predetermined distance and arranged in a definite array, such, for example, as in line with the shot point. The described position finding system may be employed for the purpose of definitely locating the position of the shot point and the position of each detector in the detector array, all in a manner which will be fully apparent from the foregoing explanation.

Further, as the shot point and the detector placement points are successively located, the recorder may be successively operated to produce a series of record indications on the record strip 40a which definitely locate geographically each of the several points. In this regard it will be understood that during each operation of the recorder 40, each recording element produces a separate and distinct trace on the record strip 40a, and that the position of the trace transversely of the strip follows variations in the energization of the galvanometer coil embodied in the recording element. Thus, as the galvanometer coil 41a is variably energized during a recording operation, a trace 41d is produced on the record strip which follows variations in the energization of the coil 41a. Since, however, at any given location of the recording boat, the coil 41a is constantly energized by current, the magnitude of which is related to the setting of the rotor element embodied in the phase meter 38, a straight line trace 41d will be produced on the record strip 40a during the recording operation. The distance between this trace and a reference line 41c representative of zero energization of the coil 41a is accurately indicative of the setting of the rotor embodied in the phase meter 38 and hence of the distance indication provided by this element.

In a similar manner, the phase meters 32, 38a, and 32a cause straight line traces 42d, 48d and 49d to be produced on the record strip 40a during each recording operation which are respectively spaced from their associated reference lines 42c, 48c and 49c by distances accurately indicative of the indications provided by the three meters 32, 38a and 32a. Thus, by operating the recorder 40 for a very short interval as each shot and detector placement point is located, a pictorial record is produced on the record strip 40a which may readily be interpreted to provide all of the necessary position information regarding the set-up prior to a shooting operation.

After the explosive charge is located at the shot point and the detectors 50—51 are located in the proper positions relative to the shot point, the explosive charge may be detonated in the usual manner to propagate seismic waves through the subsurface structure of the earth which are reflected and refracted from strata interfaces and the like to be detected by the detectors 50—51. The detected waves are converted into corresponding electrical signals by the detectors 50—51 in the usual manner and these signals are amplified by the amplifiers 52—53 and impressed upon the galvanometer coils 43—47 of the recorder 40.

This recorder is operated continuously during the shooting operation so that record traces 43d—47d are produced on the record strip 40a which pictorially depict the detected seismic waves. Concurrently with recording of the seismic wave trains picked up by the detectors 50—51, the traces, 41d, 42d, 48d and 49d are again produced on the record strip to identify the location of the recording boat during the shooting operation. After the record is thus completed, it may be severed from the record strip supply roll, developed, and interpreted, with all of the necessary information regarding the geographic locations of the shot and detector points being portrayed on the same record on which the seismic information is recorded.

From the above explanation, it will be apparent that the present invention affords a satisfactory solution to the problem of recording position data and seismic data in a form which permits ready correlation and interpretation thereof. Further, the recorded position indications produced through operation of the system are without ambiguity and may readily be interpreted by an unskilled operator of the receiving units. The system disclosed has the further advantage that standard and well known components may be employed throughout, as regards both the transmitting, receiving and recording units and the additional advantage that the apparatus may be easily operated by non-technical personnel to produce the desired records.

While one embodiment of the invention has been described, it will be understood that various modifications may be made therein which are within the true spirit and scope of the invention as defined in the appended claims.

What is desired to be secured by Letters Patent of the United States is:

1. In a system of geophysical prospecting, recording apparatus including means for driving a movable record element, prospecting apparatus including means for activating said recording apparatus to produce a record on said record element representative of a characteristic of the earth's subsurface structure, radio position finding apparatus, and means responsive to operation of said position finding apparatus for governing said recording apparatus to produce a record on said record element of the geographic position at which said first-named record is produced on said record element.

2. In a system of geophysical prospecting, prospecting apparatus including means for producing an electrical signal representative of a characteristic of the earth's subsurface structure, radio position finding apparatus including means for producing an electrical signal at least partially representative of the geographical position at which said first-named signal is produced, and recording means responsive to said first and second-named signals for recording said signals on a common record element.

3. In a system of geophysical prospecting, recording apparatus including means for driving a movable record element, prospecting apparatus including means for activating said recording apparatus to produce a record on said record element representative of a characteristic of the earth's subsurface structure, radio position finding apparatus, and means responsive to operation of said position finding apparatus for governing said recording apparatus to produce a plurality of records on said element which may be correlated to identify the geographical position at which said first-named record is produced on said record element.

4. In a system of seismic prospecting, a plurality of seismic wave detectors for converting seismic waves propagated through the earth's subsurface structure into corresponding electrical signals, a recorder for recording said signals on a common record element, radio position finding apparatus, and means responsive to operation of said position finding apparatus for governing said recorder to produce a record on said record element of the geographical position at which said first-named record is produced on said record element.

5. In a system of geophysical prospecting, prospecting apparatus including means for producing one or more indications representative of a characteristic of the earth's subsurface structure, radio position finding apparatus including means for producing one or more indications at least partially representative of the location where said first-named indications are produced, and recording means commonly controlled by said prospecting apparatus and said position finding apparatus to record all of said indications on a common record element.

JAMES E. HAWKINS.

REFERENCES CITED

The following references are of record in the file of this patent:

UNITED STATES PATENTS

| Number | Name | Date |
|---|---|---|
| 477,284 | Townsend | June 21, 1892 |
| 1,706,066 | Karcher | Mar. 16, 1929 |
| 1,784,439 | Hayes | Dec. 9, 1930 |
| 1,843,725 | Karcher | Feb. 2, 1932 |
| 2,043,336 | Sjostrand | June 9, 1936 |
| 2,144,203 | Shanklin | Jan. 17, 1939 |
| 2,224,182 | Crooke | Dec. 10, 1940 |
| 2,408,773 | Goodall | Oct. 8, 1946 |
| 2,414,976 | Redhed | Jan. 28, 1947 |
| 2,417,807 | Brunner | Mar. 25, 1947 |